3,291,809
PHOSPHATYLTHIOEPOXIDE
Henryk A. Cyba, Evanston, Ill., assignor to Universal Oil Products Company, Des Plaines, Ill., a corporation of Delaware
No Drawing. Filed Dec. 30, 1963, Ser. No. 334,641
10 Claims. (Cl. 260—327)

This application is a continuation-in-part of my co-pending now abandoned application Serial No. 174,710 filed February 21, 1962 which, in turn, is a continuation-in-part of application Serial No. 836,084 filed August 26, 1959, now abandoned, and relates to novel compositions of matter.

The novel compositions of matter are bis-(dithiophosphatyl) thioepoxyalkanes and bis-(dithiophosphatyl) thioepoxycycloalkanes and are illustrated by the following formula:

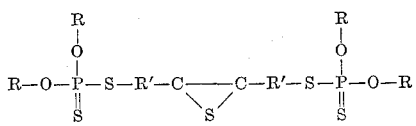

where R is hydrogen or hydrocarbon and R' is hydrocarbon.

In a preferred embodiment the novel compound of the present invention is a bis-(dithiophosphatyl) thioepoxyalkane and in this embodiment each R' comprises an alkylene group of from 1 to 6 carbon atoms and preferably of from 1 to 2 carbon atoms. Thus, the thioepoxy moiety contains from 4 to 14 carbon atoms.

In another embodiment the novel compound of the present invention is a bis-(dithiophosphatyl) thioepoxycycloalkane and in this embodiment the R' groups comprise carbon atoms of a cycloalkyl group. In a particularly preferred embodiment the cycloalkyl group is cyclohexyl, in which embodiment the R' groups contain 2 carbon atoms each. However, in another embodiment, the cyclohexyl ring group may contain alkyl group or groups attached thereto and, in this embodiment, one R' group may contain from 3 to 6 carbon atoms and the other R' group may contain from 2 to 6 carbon atoms.

As hereinbefore set forth, R in the above formula is hydrogen or a hydrocarbon group. The hydrocarbon group preferably comprises an alkyl group, which may contain from 1 to 20 carbon atoms. In another embodiment the hydrocarbon group is selected from alkylene, aryl, alkaryl, aralkyl, cycloalkyl, cycloalkylalkyl and alkylcycloalkyl. The aliphatic moiety may be substituted by a thio group, and especially of the thioether type. The aromatic ring, in turn, may be substituted by halogen and especially chlorine.

The novel compounds of the present invention are readily prepared by the reaction of an alkali metal dithiophosphate and a dihaloepoxide in the presence of an oxygen-containing polar solvent. It is essential that the reaction be effected in the presence of the oxygen-containing polar solvent in order to form the novel compounds of the present invention by the interaction of the alkali metal components of the dithiophosphate and the halogen components of the haloepoxide. When using a non-polar solvent, entirely different reaction products are obtained, apparently constituting an addition type reaction in which both the alkali metal and the halogen are retained in the final product. In addition to the difference in chemical composition of the different products, those prepared in accordance with the present invention, when of very low molecular weight, are distillable, whereas those prepared in the presence of a non-polar solvent are not distillable.

For economic reasons, sodium or potassium is preferred as the alkali metal component, although it is understood that lithium, rubidium or cesium may be utilized when desired. The reaction is readily effected by refluxing the alkali metal salt of the dithiophosphate and the dihaloepoxide in the presence of the oxygen-containing polar solvent.

In a preferred embodiment 1,4-dichloro-2,3-epoxybutane is used as the dihaloepoxide. Also, in a preferred embodiment, the dithiophosphatyl component preferably contains 1 or 2 alkyl groups each containing from 1 to about 20 carbon atoms. Illustrative compounds formed by the reaction of 1,4-dichloro-2,3-epoxybutane with dialkyldithiophosphates include 1,4-bis-S-(O,O-dimethyl dithiophosphatyl) 2,3-thioepoxybutane, 1,4-bis-S-(O,O-diethyl dithiophosphatyl) 2,3-thioepoxybutane, 1,4-bis-S-(O,O-dipropyl dithiophosphatyl) 2,3-thioepoxybutane, 1,4-bis-S-(O,O-dibutyl dithiophosphatyl) 2,3-thioepoxybutane, 1,4-bis-S-(O,O-dipentyl dithiophosphatyl) 2,3-thioepoxybutane, 1,4-bis-S-(O,O-dihexyl dithiophosphatyl) 2,3-thioepoxybutane, 1,4-bis-S-CO, O-diheptyl dithiophosphatyl) 2,3-thioepoxybutane, 1,4-bis-S-(O,O-diocytyl dithiophosphatyl) 2,3-thioepoxybutane, 1,4-bis-S-(O,O-dinonyl dithiophosphatyl) 2,3-thioepoxybutane, 1,4-bis-S-(O,O-didecyl dithiophosphatyl) 2,3-thioepoxybutane, 1,4-bis-S-(O,O-diundecyl dithiophosphatyl) 2,3-thioepoxybutane, 1,4-bis-S-(O,O-didodecyl dithiophosphatyl) 2,3-thioepoxybutane, 1,4-bis-S-CO,O-diheptyl dithiophosphatyl) 2,3-thioepoxybutane, 1,4-bis-S-(O,O-ditetradecyl dithiophosphatyl) 2,3-thioepoxybutane, 1,4-bis-S-(O,O-dipentadecyl dithiophosphatyl) 2,3-thioepoxybutane, 1,4-bis-S-(O,O-dihexadecyl dithiophosphatyl) 2,3-thioepoxybutane, 1,4-bis-S-(O,O-diheptadecyl dithiophosphatyl) 2,3-thioepoxybutane, 1,4-bis-S-(O,O-dioctadecyl dithiophosphatyl) 2,3-thioepoxybutane, 1,4-bis-S-(O,O-dinonadecyl dithiophosphatyl) 2,3-thioepoxybutane, 1,4-bis-S-(O,O-dieicosyl dithiophosphatyl) 2,3-thioepoxybutane, etc. Generally the alkyl groups are the same as illustrated in the compounds specifically set forth above. When desired, the alkyl groups may be different as, for example, in compounds as 1,4-bis-S-(O-propyl-O-pentyl dithiophosphatyl) 2,3-thioepoxybutane, 1,4-bis-S-(O-pentyl-O-tridecyl dithiophosphatyl) 2,3-thioepoxybutane, etc. The alkyl groups may be straight or branched chain.

Illustrative compounds in which a monoalkyl dithiophosphate is reacted with 1,4-dichloro-2,3-epoxybutane include 1,4-bis-S-(O-methyl dithiophosphatyl) 2,3-thioepoxybutane, 1,4-bis-S-(O-ethyl dithiophosphatyl) 2,3-thioepoxybutane, 1,4-bis-S-(O-propyl dithiophosphatyl) 2,3-thioepoxybutane, 1,4-bis-S-(O-butyl dithiophosphatyl) 2,3-thioepoxybutane, 1,4-bis-S-(O-pentyl dithiophosphatyl) 2,3-thioepoxybutane, 1,4-bis-S-(O-hexyl dithiophosphatyl) 2,3-thioepoxybutane, 1,4-bis-S-(O-heptyl dithiophosphatyl) 2,3-thioepoxybutane, 1,4-bis-S-(O-octyl dithiophosphatyl) 2,3-thioepoxybutane, 1,4-bis-S-(O-nonyl dithiophosphatyl) 2,3-thioepoxybutane, 1,4-bis-S-(O-decyl dithiophosphatyl) 2,3-thioepoxybutane, 1,4-bis-S-(O-undecyl dithiophosphatyl) 2,3-thioepoxybutane, 1,4-bis-S-(O-dodecyl dithiophosphatyl) 2,3-thioepoxybutane, 1,4-bis-S-(O-tridecyl dithiophosphatyl) 2,3-thioepoxybutane, 1,4-bis-S-(O-tetradecyl dithiophosphatyl) 2,3-thioepoxybutane, 1,4-bis-S-(O-pentadecyl dithiophosphatyl) 2,3-thioepoxybutane, 1,4-bis-S-(O-hexadecyl dithiophosphatyl) 2,3-thioepoxybutane, 1,4-bis-S-(O-heptadecyl dithiophosphatyl) 2,3-thioepoxybutane, 1,4-bis-S-(O-octadecyl dithiophosphatyl) 2,3-thioepoxybutane, 1,4-bis-S-(O-nonadecyl dithiophosphatyl) 2,3-thioepoxybutane, 2,4-bis-S-(O-eicosyl dithiophosphatyl) 2,3-thioepoxybutane, etc.

Mixtures of mono- and dialkyl dithiophosphates are available commercially, generally at a lower price, and such mixtures conveniently are used in preparing the novel compounds of the present invention. In such cases, the composition comprises a mixture of the monoalkyl and dialkyl dithiophosphatyl thioepoxyalkane bis compounds.

The specific compounds illustrated above are prepared by the reaction of the dithiophosphates and 1,4-dichloro-2,3-epoxybutane. Other dichloro epoxyalkanes which may be reacted with the dithiophosphates include 1,4-dichloro - 2,3 - epoxypentane, 1,4-dichloro-2,3-epoxyhexane, 2,5 - dichloro - 3,4-epoxyhexane, 1,4-dichloro-2,3-epoxyheptane, 2,5 - dichloro - 3,4 - epoxyheptane, 1,4-dichloro - 2,3 - epoxyoctane, 1,4 - epoxyheptane, 1,4-etc., 1,5 - dichloro - 2,3 - epoxyheptane, 1,5-dichloro-2,3-epoxyhexane, 1,5-dichloro-2,3-epoxyheptane, 1,5-dichloro-2,3-epoxyoctane, etc., 1,6-dichloro-2,3-epoxyhexane, 1,6-dichloro-2,3-epoxyheptane, 1,6-dichloro-2,3-epoxyoctane, etc., 1,7 - dichloro - 2,3 - epoxyheptane, 1,7-dichloro-2,3-epoxyoctane, 1,7-dichloro-2,3-epoxynonane, 1,7-dichloro-2,3-epoxydecane, 1,7-dichloro-2,3-epoxyundecane, etc., 1,8-dichloro-2,3-epoxyoctane, 1,8-dichloro-2,3-epoxynonane, 1,8-dichloro-2,3-epoxydecane, etc. In general, it is preferred that the epoxy configuration is in a position alpha to a carbon atom to which the chlorine is attached. However, in another embodiment, the epoxy configuration may be in an intermediate position in the alkane chain as, for example, in compounds as 1,6-dichloro-3,4-epoxyhexane, 1,8-dichloro-4,5-epoxyoctane, etc. In another embodiment the polyhalogenated epoxides may have halogens attached to all carbon atoms, including those to which the epoxy group is attached as, for example, in compounds as 1,2,3,4-tetrachloro-2,3-epoxybutane, etc.

As illustrative of compounds prepared in the embodiment described in the preceding paragraph, the following compounds are specifically set forth with the understanding that these are intended as illustrative but not limiting examples. These compounds include 1,4-bis-S-(O-propyl dithiophosphatyl) 2,3-thioepoxypentane, 1,5-bis-S-(O,O-dihexyl dithiophosphatyl) 2,3-thioepoxypentane, 1,4-bis-S-(O-ethyl dithiophosphatyl) 2,3-thioepoxyhexane, 1,5 - bis-S-(O,O-dipentyl dithiophosphatyl) 3,4-thioepoxyhexane, 1,7 - bis - S - (O,O-dibutyl dithiophosphatyl) 2,3-thioepoxyheptane, 2,6-bis-S-(O-decyl dithiophosphatyl) 3,4-thioepoxyheptane, etc.

In still another embodiment the dihaloepoxide may contain two epoxy groups in the long chain epoxyalkane embodiment. For example, the dihaloepoxide used for reaction with the dithiophosphate may comprise 1,7-dichloro - 2,3,5,6 - diepoxyheptane, 1,8-dichloro-2,3,4,5-diepoxyoctane, etc. Illustrative examples of compounds prepared by the reaction of dithiophosphates with the dichlorodiepoxyalkanes include 1,7-bis-S-(O-ethyl dithiophosphatyl) 2,3,5,6-dithioepoxyheptane, 1,8-bis-S-(O,O-dioctyl dithiophosphatyl) 2,3,6,7-dithioepoxyoctane, etc.

As hereinbefore set forth, another embodiment of the invention comprises bis-(dithiophosphatyl) thioepoxycycloalkanes. These compounds are prepared by the reaction of the dithiophosphate with dichloroepoxycycloalkanes which, in turn, are prepared by the epoxidation of dichlorocycloalkenes. For example, 1,4- dichloro-2,3-epoxycyclohexane is prepared by the epoxidation of 1,4-dichlorocyclohexene. In one method the epoxidation is effected utilizing hydrogen peroxide and reaction at a temperature within the range of from about room temperature to about 120° C. In another method, peracetic acid or other suitable peracids are used. In still another embodiment, dichlorodiepoxycyclohexane is used as the dichloroepoxide. For example, 1,4-dichloro-2,3,5,6-diepoxycyclohexane is prepared by the oxidation of 1,4-dichlorocyclohexadiene, which reaction is effected in substantially the same manner as hereinbefore described. Illustrative but not limiting compounds in this embodiment of the invention include 1,4-bis-S-(O-hexyl dithiophosphatyl) 2,3-thioepoxycyclohexane, 1,4-bis-S-(O,O-dimethyl dithiophosphatyl) 2,3-thioepoxycyclohexane, 1, 4 - bis-S-(O,O-diethyl dithiophosphatyl) 2,3-thioepoxycyclohexane, 1,4-bis-S-(O-methyl-O-stearyl dithiophosphatyl) 2,3 - thioepoxycyclohexane, etc., 1,4-bis-S-(O-dodecyl dithiophosphatyl) 2,3,5,6-dithioepoxycyclohexane, 1,4-bis-S-(O,O-diethyl dithiophosphatyl) 2,3,5,6-dithioepoxycyclohexane, 1,4 - bis-S-(O-methyl-O-dodecyl dithiophosphatyl) 2,3,5,6 - dithioepoxycyclohexane, etc. Although the cyclohexane derivatives are preferred, corresponding cyclopentane or cyclobutane or cyclooctane derivatives are within the scope of this application, such as 1,2-bis-S-(O,O-dimethyl dithiophosphatyl) 3,4-thioepoxycyclobutane, 1,2-bis-S-(O,O-diethyl dithiophosphatyl) 3,4-thioepoxycyclobutane, etc. Epoxycycloalkanes containing chlorine in all other positions, including the carbon atoms to which the epoxy group is attached, are within the scope of the present invention.

In general, it is preferred to use the dichloroepoxides in preparing the novel compounds of the present invention. However, it is understood that the bromo-substituted compounds may be used and, in still other cases, the corresponding iodo or fluoro or mixed halo-substituted compounds may be employed in preparing the novel compounds of the present invention.

As hereinbefore set forth, the novel compounds of the present invention are readily prepared by the reaction of an alkali metal dithiophosphate and a dihaloepoxide in the presence of the oxygen-containing polar solvent. The compounds are prepared by reacting two mole proportions or more of the dithiophosphate with one mole proportion of the dihaloepoxide. The reaction is readily effected by refluxing the reactants for a time sufficient to accomplish the desired reaction. This may range from 0.5 to 48 hours or more and generally will be for a time of from about 3 to about 20 hours. The refluxing temperature generally will be within the range of from about 30° to about 150° C. and preferably about 50° to about 100° C. The pressure may range from atmospheric to 1000 p.s.i.g. or more.

As hereinbefore set forth, it is essential that the reaction is effected in the presence of an oxygen-containing polar solvent. Any suitable oxygen-containing polar solvent is employed including alcohols, particularly methanol, ethanol, propanol, butanol, etc., ketones including acetone, methyl ethyl ketone, diethyl ketone, dipropyl ketone, etc., and glycols, glycolethers, alkylamides, dimethylformamide, dimethylacetamide, nitromethane, dimethyl or diethyl sulfoxide, dimethyl ether, diethyl ether, water, etc. When desired, either or both of the reactants may be prepared as a solution in the solvent for ease of handling or in forming a more fluid reaction mixture, or the solvent may be added directly to the reaction mixture. The solvent permits effecting the reaction at lower temperature and thereby favors the formation of monomers. Polymers are formed at the higher temperatures. The polymers or polycondensates are not harmful in lubricating oils, but are undesirable in pesticidal and insecticidal formulations.

In one method of operation the dihaloepoxide and alkali metal dialkyldithiophosphate are formed as separate solutions in an alcoholic solvent. The solutions then are mixed, and the mixture is heated and maintained at refluxing conditions for the desired time. Following the completion of the reaction, the desired product is recovered in any suitable manner. Alkali metal halide formed in the reaction is removed by filtering. The product then may be dissolved in an aromatic solvent, washed with water and/or sodium bicarbonate or similar solution, dried over anhydrous sodium sulfate, anhydrous potassium carbonate or the like, and then filtered and heated to remove the aromatic solvent, the latter generally being effected under vacuum.

The compositions of this invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The compounds or mixture of these may be used for the control of various larvae, mites, eggs of mites and such insects as flour beetle, mexican bean beetle, black carpet beetle, milkweed bug, german cockroaches, southern army worms, mealy bug, sow bug, citrus red spider, greenhouse red spider, various mosquitoes, yellow fever mosquito, malarial mosquito, etc.

The novel composition of the present invention also is particularly useful as an additive to hydrocarbon oil and still more particularly to lubricating oil. In the latter oil, the compound serves a number of important functions such as oxidation inhibitor (peroxide decomposer), bearing corrosion inhibitor, ring anti-plugging additive, extreme pressure additive, detergent, etc.

The lubricating oil may be straight mineral lubricating oil derived from paraffinic, naphthenic, asphaltic or mixed base petroleum crudes or blends thereof and is generally highly refined. In another embodiment the lubricating oil is a synthetic lubricating oil and may be one or a mixture of various types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberate, dialkyl pimelates, dialkyl adipates, dialkyl glutarates, etc. Specific exampes of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides and derivatives include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. Synthetic lubricants proposed for use in high temperature service as, for example, jet fuel lubrication, are pentaerythritol esters and trimethyl propane esters.

The novel composition of the present invention also is useful as an additive to lubricating greases. These may be either of synthetic or petroleum origin. The synthetic greases generally are referred to as lithium base grease, sodium base grease, calcium base grease, barium base grease, strontium base grease, aluminum base grease, etc. These greases are solid or semi-solid gels and, in general, are prepared by the addition to mineral or synthetic lubricating oils of hydrocarbon-soluble metal soaps or salts of higher fatty acids as, for example, lithium stearate, calcium stearate, aluminum naphthenate, etc. The grease may contain thickening agents such as silica, carbon black, polyacrylates, talc, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow butchers waste, etc.

The novel composition also is useful in the stabilization of polyolefins and particularly polyethylene. The polyolefins preferably are of high molecular weight, usually having a molecular weight above 1000 and extending into the hundreds of thousand range. Generally, these are synthetically prepared. A typical example is the widely used polyethylene plastics. Other polyolefins include polypropenes, polybutenes, mixed polymers of ethylene and propylene, ethylene butylene, propylene and butylene, ethylene, propylene and butylene, as well as polymers of higher molecular weight olefins. These may be of the high density, medium density, or low density type. Polyethylene is utilized, for example, as thermoplastic molding or coating agent. Because of its high dielectric strength and its resistance to water, polyethylene is particularly advantageous for use as insulators or dielectrics in condensers and other similar electronic equipment. However, polyethylene is subject to attack by atmospheric oxygen, particularly at elevated temperatures, either in use or during manufacture, and this impairs the desirable properties thereof including, for example, a reduction in the desirable electric properties, gellation upon oxidation, etc.

Other organic substances which deteriorate in storage, during treatment and/or in use include hydrocarbons and particularly motor fuels such as unsaturated gasoline, blends of unsaturated and saturated gasolines, etc., as well as jet fuel, diesel oil, mineral oil, fuel oil, residual oil, drying oil, waxes, resins, rubber, etc. These substances are adversely affected by oxygen, with the resultant formation of one or more of undesirable gum, sediment, discoloration, cracking, corrosion and/or other deleterious reactions.

When used as an additive to organic substrates, the novel compounds of the present invention may be utilized in a concentration of from about 0.0001% to about 25% by weight of the organic substrate, although in some cases higher or lower concentrations may be employed. The exact concentration to be used will depend upon the particular substrate to be treated. In most cases concentrations from about 0.01% to about 2% by weight generally will be employed.

It is understood that the composition of the present invention may be used along with other additives incorporated in the organic substrate. For example, one or more of an additional additive including metal deactivator, dye, viscosity index improver, pour point depressant, anti-foaming additive, lubricity and extreme pressure additive, anti-scuffing additive, detergent, dispersant, corrosion inhibitor, etc., may be incorporated in the substrate. When desired, the composition of the present invention may be prepared as a mixture with one or more of these other additives and marketed and/or incorporated in the substrate in this manner. The composition of the present invention may be incorporated in the organic substrate in any suitable manner and at any suitable stage of preparation. When incorporated in a liquid substrate, the composition of matter is added thereto and intimately mixed by conventional means. When added to a solid or semi-solid substrate, the composition of the present invention preferably is added during the manufacture thereof in order to obtain intimate mixing. For example, in the manufacture of grease, the composition of the present invention may be added to the mix at any time, preferably before final processing in order to obtain intimate mixing and dissolving thereof in the grease. In other cases, the solid substrate may be dipped, soaked or immersed in the additive, or the latter may be sprayed, brushed or otherwise applied to the solid substrate.

The following examples are introduced to illustrate further the novelty and utility of the present invention but not with the intention of unduly limiting the same.

*Example 1*

1,4-bis-S-(O,O-diisopropyl dithiophosphatyl) 2,3-thioepoxybutane was prepared as follows: 138 g. (0.5 mole + 12 g.) of potassium diisopropyl dithiophosphate were dissolved in 200 g. of refluxing methanol. 35.25 g. (0.25 mole) of 1,4-dichloro-2,3-epoxybutane were dissolved in 20 g. of methanol and the resultant solution was added dropwise to the refluxing solution of potassium diisopropyl dithiophosphate. Refluxing was continued for 6 hours, after which the reaction mixture was allowed to cool, filtered to remove potassium chloride, toluene solvent added and then washed three times with water, dried over anhydrous sodium sulfate, filtered, and the toluene removed by heating on a steam bath under water pump vacuum. The product comprises 1,4-bis-S-(O,O-diisopropyl dithiophosphatyl) 2,3-thioepoxybutane and was recovered in a yield of 87 g. as a reddish brown oily liquid having an index of refraction $n_D^{20}$ of 1.5278.

Analyses of the product for sulfur and phosphorus contents indicate that the product is a mixture of 1,4-bis-S-(O,O-diisopropyl dithiophosphatyl) 2,3-thioepoxybutane and 1,4-bis-S-(O,O-diisopropyl dithiophosphatyl) 2,3-epoxybutane. The analyses showed 9.43% phosphorus and 25.5% sulfur. Analysis of the product for potassium concentration showed only 0.016% by weight. This is in contrast to the 13.6% by weight of potassium which otherwise would be present if the potassium were retained in the product.

*Example II*

The compound prepared in Example I was evaluated as an additive to lubricating oil. The evaluation was conducted in a Lauson engine. In this series of tests, the runs were continued for 115 hours, using a jacket temperature of 210° F. and an oil temperature of 280° F. A typical commercial paraffinic-solvent extracted lubricating oil was used. Pertinent results of these runs are reported in the following table:

TABLE I

| Run Number | 1 | 2 |
| --- | --- | --- |
| Additive | None | 0.5% by weight of Example I Product |
| Bearing wt. loss, gms | 2.9021 | 0.0049 |
| Oil ring plugging, percent | 5 | 0 |
| Oil consumption, ml./hr | 6.03 | 10.49 |
| Used Oil: | | |
| Neutralization No | 10.78 | 0.68 |
| Saponification No., Mg. KOH/gm | 25.9 | 3.51 |
| Pentane insolubles, percent | 5.16 | 0.51 |
| Viscosity, SSU at— | | |
| 100° F | 742 | 377 |
| 210° F | 74.7 | 56.7 |

From the data in the above table, it will be noted that the novel compound of the present invention was very effective in reducing corrosion, as evidenced by the very low bearing weight loss in Run No. 2 as compared to Run No. 1 made in the absence of the additive. Also, the compound was effective in preventing undesired changes in the lubricating oil, as evidenced by the neutralization number, saponification number, percent pentane insolubles and viscosities.

*Example III*

1,4-bis-S-(O,O-diethyl dithiophosphatyl) 2,3-thioepoxybutane was prepared as follows: 110 g. (0.5 mole+12 g.) of potassium diethyl dithiophosphate are dissolved in 200 g. of refluxing Formula 30 alcohol. 35.25 g. (0.25 moles) of 1,4-dichloro-2,3-epoxybutane are dissolved in 20 g. of Formula 30 alcohol and the resultant solution is added dropwise to the refluxing solution of potassium diethyl dithiophosphate. Refluxing is continued for 6 hours, after which the mixture is filtered to remove crystalline potassium chloride, toluene solvent is added and then washed 3 times with water, dried over anhydrous sodium sulfate and the toluene removed by heating on a steam bath under water pump vacuum. The product is recovered as a reddish brown oily liquid.

*Example IV*

1,4-bis-S-(O,O-ditolyl dithiophosphatyl) 2,3-thioepoxybutane is prepared by reacting 2 molar proportions of ditolyl dithiophosphate potassium salt with 1 molar proportion of 1,4-dibromo-2,3-epoxybutane. The reaction is effected in substantially the same manner as hereinbefore set forth and the desired product is recovered by washing, filtering to remove potassium chloride and vacuum distillation to remove entrained solvent.

*Example V*

1,4-bis-S-(O,O-dicyclohexyl dithiophosphatyl) 2,3-thioepoxypentane is prepared by reacting 2 molar proportions of dicyclohexyl dithiophosphate sodium salt with 1 molar proportion of 1,4-dichloro-2,3-epoxypentane. The reaction is effected in substantially the same manner as hereinbefore set forth and the desired product is recovered by washing, filtering to remove sodium chloride and distilling under vacuum to remove entrained solvent.

*Example VI*

The compound of this example is 1,4-bis-S-(O,O-diethyl dithiophosphatyl) 2,3-thioepoxycyclohexane and is prepared by refluxing 2 molar proportions of O,O-diethyl dithiophosphate potassium salt in ethanol solvent and then gradually adding thereto 1 molar proportion of 1,4-dichloro-2,3-epoxycyclohexane dissolved in ethanol solvent. The refluxing is continued for 6 hours, after which the reaction mixture is filtered to remove potassium chloride. The filtrate then is worked-up in the manner heretofore described.

I claim as my invention:
1. A compound selected from the group consisting of bis-(dithiophosphatyl) thioepoxyalkane having from 4 to 14 carbon atoms in the thioepoxy moiety and bis-(dithiophosphatyl) thioepoxycycloalkane having from 6 to 14 carbon atoms in the thioepoxy moiety.
2. 1,4-bis-S-(dithiophosphatyl) thioepoxyalkane having from 4 to 14 carbon atoms in the thioepoxy moiety.
3. 1,4-bis - S - (O-alkyl dithiophosphatyl) thioepoxyalkane having from 1 to 20 carbon atoms in the alkyl group and from 4 to 14 carbon atoms in the thioepoxy moiety.
4. 1,4-bis-S-(O,O-dialkyl dithiophosphatyl) thioepoxyalkane having from 1 to 20 carbon atoms in each of the alkyl groups and from 4 to 14 carbon atoms in the thioepoxy moiety.
5. 1,4-bis-S-(O,O-diethyl diethylphosphatyl) 2,3-thioepoxybutane.
6. 1,4-bis-S-(O-O-diisopropyl dithiophosphatyl) 2,3-thioepoxybutane.
7. 1,4-bis-S-(O,O-ditolyl dithiophosphatyl) 2,3-thioepoxybutane.
8. 1,4-bis-S-(O,O-dicyclohexyl dithiophosphatyl) 2,3-thioepoxybutane.
9. 1,4-bis-S-(O,O-dialkyl dithiophosphatyl) thioepoxycycloalkane having from 1 to 20 carbon atoms in each of the alkyls and from 6 to 14 carbon atoms in the thioepoxy moiety.
10. 1,4-bis-S-(O,O-dialkyl dithiophosphatyl) 2,3-thioepoxycyclohexane having from 1 to 20 carbon atoms in each of the alkyl groups.

No references cited.

WALTER A. MODANCE, *Primary Examiner.*

J. A. PATTEN, *Assistant Examiner.*